United States Patent Office 3,418,302
Patented Dec. 24, 1968

3,418,302
PERFLUOROCYCLIC ETHER POLYMERS
Robert Albert Darby, Vienna, W. Va., assignor to E. I. du Pont de Nemours and Company, Wilmington, Del., a corporation of Delaware
No Drawing. Filed Aug. 30, 1963, Ser. No. 305,837
5 Claims. (Cl. 260—87.5)

The present invention relates to perfluorocyclic ether resins obtained by the polymerization of a fluorocarbon divinyl ether.

The polymerization of a vinyl compound normally proceeds through the opening of the double bond and addition to a growing polymer molecule without affecting the remainder of the molecule. In the polymerization of vinyl compounds, which contain two unsaturated groups, one or both vinyl groups will enter into the reaction depending on the nature of the compound. Where both double bonds are polymerized a crosslinked material is obtained while if only one double bond is reacted, an unsaturated resin is obtained. The formation of linear substantially saturated polymers from compounds containing two double bonds is therefore extremely unusual.

In accordance with the present invention, it was discovered that perfluorodimethylene-bis(perfluorovinyl ether) when polymerized in certain ways gives rise to polymers having structures of the class consisting of:

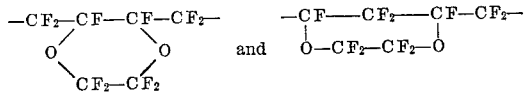

and no measurable unsaturation as determined by infrared spectroscopy. The two isomeric cyclic structures result through a bond being formed between the carbon atom of one of the vinyl groups which is attached to an oxygen atom with either carbon atom of the other vinyl group. Both structures are formed during polymerization.

The polymerization of perfluorodimethylene-bis(perfluorovinyl ether) can be controlled to result in the intramolecular cyclization by polymerizing the divinyl ether in dilute concentrations, e.g., in the presence of a liquid medium. The intramolecular cyclization also occurs when the divinyl ether is copolymerized with other monovinyl compounds in the presence of an inert liquid diluent. Particularly preferred comonomers comprise perfluoroalkyl perfluorovinyl ethers having the formula:

$$R_f\text{—O—CF}=CF_2$$

where $R_f$ is a perfluoroalkyl radical of one to twelve carbon atoms, perfluoroolefins having the formula:

$$XCF=CF_2$$

where X is fluorine or the perfluoromethyl radical and perfluorovinyl perfluoroalkoxy ethers having the formula:

$$CF_2X\text{—}CF_2\text{—O(—}CFX\text{—}CF_2\text{—O)}_m\text{—}CF=CF_2$$

where X is fluorine or the perfluoromethyl radical and $m$ is a number from 1 to 4. Specific examples of suitable comonomers include perfluoromethyl perfluorovinyl ether, perfluoropropyl perfluorovinyl ether, tetrafluoroethylene, hexafluoropropylene, and perfluoro-2-propoxypropyl perfluorovinyl ether.

The polymerization is preferably carried out in an inert liquid medium and in particular in an inert perfluorocarbon solvent. Suitable solvents include perfluoroheptane, perfluorocyclohexane, perfluorodimethylcyclobutane, perfluorobenzene, perfluorodioxane, perfluorotriethylamine, perfluoro-1,3,5-trimethylhexene-3, and perfluoro-1,2-di(methoxy)cyclobutane. The initiator employed for the polymerization of perfluorodimethylene-bis(perfluorovinyl ether) can be any compound giving rise to free radicals but is preferably a perfluorinated initiator such as a perfluoroperoxide or perfluoroazo compound or a compound containing an N–F bond. In addition, ultraviolet light can be used as a free radical initiator. The polymerization temperature can be varied widely and is not critical, but should be high enough to allow the decomposition of the particular initiator compound employed, and should be low enough to avoid excessive rearrangement of the

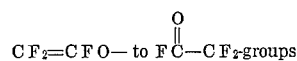

Since the divinyl ether is liquid, polymerization is normally carried out at atmospheric pressure, although higher pressure may be advantageously employed where the comonomer is gaseous at the polymerization conditions.

The formation of the polymeric materials of the present invention is further illustrated by the following examples:

EXAMPLE I

In a glass carius tube were charged 2 g. of perfluorodimethylene-bis(perfluorovinyl ether) and 18 g. of perfluorodimethylcyclobutane. The tube was cooled to −80° C., evacuated, and charged with 3 mole percent $N_2F_2$ based on monomer. The tube was sealed and allowed to stand at 25° C. for 24 hours. The gel so formed was dried in vacuo at 100°. The resulting granular polymer could be pressed to a clear, stiff, tough film at 250° and 30,000 p.s.i. The polymer was found to contain no unsaturation as measured by infrared analysis.

EXAMPLE II

In a platinum tube sealed at one end were placed 0.5 ml. of perfluorodimethylene-bis(perfluorovinyl ether), 0.27 g. of tetrafluoroethylene, 4 ml. perfluorodimethylcyclobutane and 0.02 ml. of 2,3-bis(difluoroamino)perfluoro-2-butene. The charge consisted of equimolar amounts of tetrafluoroethylene and perfluorodimethylene - bis(perfluorovinyl ether). The platinum tube was sealed, placed in a shaker tube, and pressured to 900 atm. with nitrogen. It was then heated to 75° C. for 3 hours. A quantitative conversion to a copolymer of approximately 1/1 composition was obtained. This polymer could be pressed to a clear, stiff, tough film at 250° and 30,000 p.s.i. The polymer was free from unsaturation.

EXAMPLE III

Into a Pyrex carius tube are placed 4 g. of perfluoromethyl perfluorovinyl ether, 2 g. of perfluorodimethylene-bis(perfluorovinyl ether) and 14 g. of perfluorodimethylcyclobutane. The tube is cooled to −80° C. and 3 mole percent of $N_2F_2$ based on monomer is added. The tube is sealed and allowed to stand at 25° C. for 24 hours. A solid copolymer of perfluoromethyl perfluorovinyl ether and perfluorodimethylene-bis(perfluorovinyl ether) is obtained.

Using the techniques illustrated, similar copolymers of the perfluoromethylene-bis(perfluorovinyl ether) are also prepared with the comonomers not specifically illustrated but included in the foregoing description.

The polymers of the present invention are high molecular weight solid thermoplastic resins which can be fabricated into film, fiber, and other shaped articles by melt extrusion, and injection molding. The polymers of the present invention have outstanding chemical and thermal stability and superior electrical properties. Hence, the polymers in film form or in other forms are extremely useful insulating materials. The polymer can further be employed in other uses heretofore developed for fluorocarbon resins.

I claim:
1. A substantially saturated solid thermoplastic polymer of perfluorodimethylene-bis(perfluorovinyl ether) containing structures of the class consisting of:

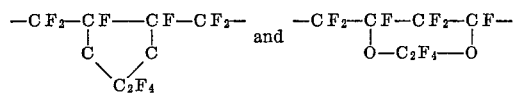

2. A substantially saturated solid thermoplastic homopolymer of perfluorodimethylene-bis(perfluorovinyl ether) containing structures of the class of:

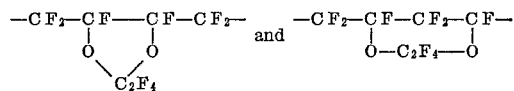

3. A substantially saturated solid thermoplastic copolymer of perfluorodimethylene-bis(perfluorovinyl ether) and a perfluoroolefin having the structure of $CF_2$=CFX where X is selected from the group consisting of fluorine and the perfluoromethyl groups, said copolymer containing structures of the class consisting of:

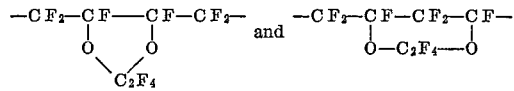

4. A substantially saturated thermoplastic copolymer of perfluorodimethylene-bis(perfluorovinyl ether) and a perfluorovinyl ether having the formula:

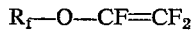

where $R_f$ is a perfluoroalkyl radical of one to twelve carbon atoms, said copolymer containing structures of the class consisting of:

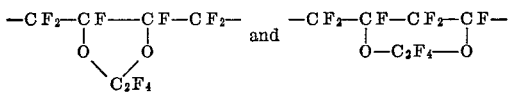

5. A substantially solid saturated thermoplastic copolymer of perfluorodimethylene-bis(perfluorovinyl ether) and a perfluorovinyl ether having the formula:

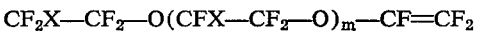

where X is selected from the class consisting of fluorine and the perfluoromethyl groups and $m$ is an integer of one to four, said copolymer containing structures of the class consisting of:

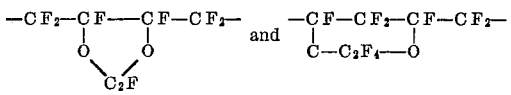

References Cited

UNITED STATES PATENTS 3,162,622  12/1964  Aldrich _____ 260—87.5

JOSEPH L. SCHOFER, *Primary Examiner.*

J. A. DONAHUE, JR., *Assistant Examiner.*

U.S. Cl. X.R.

260—91.1

UNITED STATES PATENT OFFICE
CERTIFICATE OF CORRECTION

Patent No. 3,418,302                                 December 24, 1968

Robert Albert Darby

It is certified that error appears in the above identified patent and that said Letters Patent are hereby corrected as shown below:

Column 3, lines 5 to 8, the left-hand formula should appear as shown below:

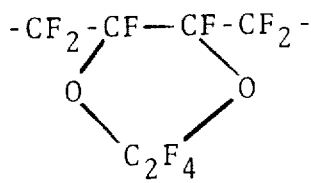

same column 3, line 18, cancel "of". Column 4, lines 16 to 19, the left-hand formula should appear as shown below:

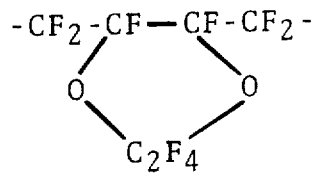

Signed and sealed this 7th day of April 1970.

(SEAL)
Attest:

EDWARD M. FLETCHER, JR.                    WILLIAM E. SCHUYLER, JR.
Attesting Officer                                   Commissioner of Patents